(12) United States Patent
Da Silva

(10) Patent No.: US 10,134,270 B2
(45) Date of Patent: Nov. 20, 2018

(54) ENHANCEMENTS INTRODUCED IN A PORTABLE MOISTURE METER DEVICE FOR REMOTE USE

(71) Applicant: Manoel Henrique Da Silva, Curitiba (BR)

(72) Inventor: Manoel Henrique Da Silva, Curitiba (BR)

( * ) Notice: Subject to any disclaimer, the term of this patent is extended or adjusted under 35 U.S.C. 154(b) by 0 days.

(21) Appl. No.: 15/622,791

(22) Filed: Jun. 14, 2017

(65) Prior Publication Data

US 2018/0025625 A1    Jan. 25, 2018

(30) Foreign Application Priority Data

Apr. 20, 2016 (BR) ...................... 10 2016 008802 0

(51) Int. Cl.
| | |
|---|---|
| *G08C 17/02* | (2006.01) |
| *G06K 19/06* | (2006.01) |
| *G06Q 30/02* | (2012.01) |
| *H04L 29/08* | (2006.01) |
| *H04W 4/38* | (2018.01) |
| *G06Q 50/02* | (2012.01) |
| *H04L 29/06* | (2006.01) |
| *H04W 4/02* | (2018.01) |

(52) U.S. Cl.
CPC ....... *G08C 17/02* (2013.01); *G06K 19/06037* (2013.01); *G06Q 30/0283* (2013.01); *H04L 67/12* (2013.01); *H04W 4/38* (2018.02); *G06Q 50/02* (2013.01); *H04L 63/0428* (2013.01); *H04W 4/02* (2013.01)

(58) Field of Classification Search
CPC ............. G08C 17/02; G06K 19/06037; G06Q 30/0283; H04L 67/12; G06F 13/28; G06F 13/385; G06F 17/3028; G09G 5/393; H04M 1/72527

See application file for complete search history.

(56) References Cited

U.S. PATENT DOCUMENTS

| | | | | |
|---|---|---|---|---|
| 4,156,907 A | * | 5/1979 | Rawlings | G06F 13/385 709/212 |
| 4,200,930 A | * | 4/1980 | Rawlings | G06F 13/385 709/212 |
| 4,292,669 A | * | 9/1981 | Wollum | G06F 13/385 710/64 |

(Continued)

*Primary Examiner* — Orlando Bousono
(74) *Attorney, Agent, or Firm* — Bay State IP, LLC

(57) ABSTRACT

A portable moisture measuring device for remote use and to be applied in the agribusiness industry, for providing quality information in the creation of management reports, with the object to obtain precise information to feed into a databank, historic data, statistics and control, through the introduction of multiple communications blocks (1-G), (1-H) and a visualization block (1-I) in the moisture measuring device (1), in conjunction with a receiver device (2) possessing a pair of communications block (2-A), an image capture block (2-C), a processor block (2-D), an image processor block (2-E), a visualization block (2-F), a memory block (2-G) with saved dedicated software, a geo-reference block (2-H) with a power supply block (2-I) and a data transmission block (2-J), thereby allowing data computerization, and creating the advantages of application flexibility.

3 Claims, 1 Drawing Sheet

(56) References Cited

U.S. PATENT DOCUMENTS

| | | | | | |
|---|---|---|---|---|---|
| 5,410,727 | A | * | 4/1995 | Jaffe | G06F 7/785 709/213 |
| 5,487,146 | A | * | 1/1996 | Guttag | G06F 13/28 345/519 |
| 5,493,646 | A | * | 2/1996 | Guttag | G06F 13/28 345/501 |
| 5,524,265 | A | * | 6/1996 | Balmer | G06F 13/28 711/212 |
| 5,560,030 | A | * | 9/1996 | Guttag | G06F 13/28 712/16 |
| 5,596,693 | A | * | 1/1997 | Needle | G06T 1/20 345/473 |
| 5,625,580 | A | * | 4/1997 | Read | G01R 31/31919 703/21 |
| 5,724,599 | A | * | 3/1998 | Balmer | G06F 15/16 710/260 |
| 6,073,190 | A | * | 6/2000 | Rooney | G06F 13/4059 710/100 |
| 6,185,629 | B1 | * | 2/2001 | Simpson | G06F 12/0215 710/10 |
| 6,238,291 | B1 | * | 5/2001 | Fujimoto | A63F 13/02 273/178 B |
| 6,507,855 | B1 | * | 1/2003 | Stern | G06F 8/73 715/234 |
| 2003/0033417 | A1 | * | 2/2003 | Zou | G06F 3/023 709/230 |
| 2004/0166881 | A1 | * | 8/2004 | Farchmin | G01S 5/0252 455/457 |
| 2005/0021885 | A1 | * | 1/2005 | Anderson | H04L 1/0061 710/29 |
| 2005/0091270 | A1 | * | 4/2005 | Beilinson | G06F 17/3028 |
| 2011/0087732 | A1 | * | 4/2011 | Lakshmanan | H04L 67/303 709/204 |

* cited by examiner

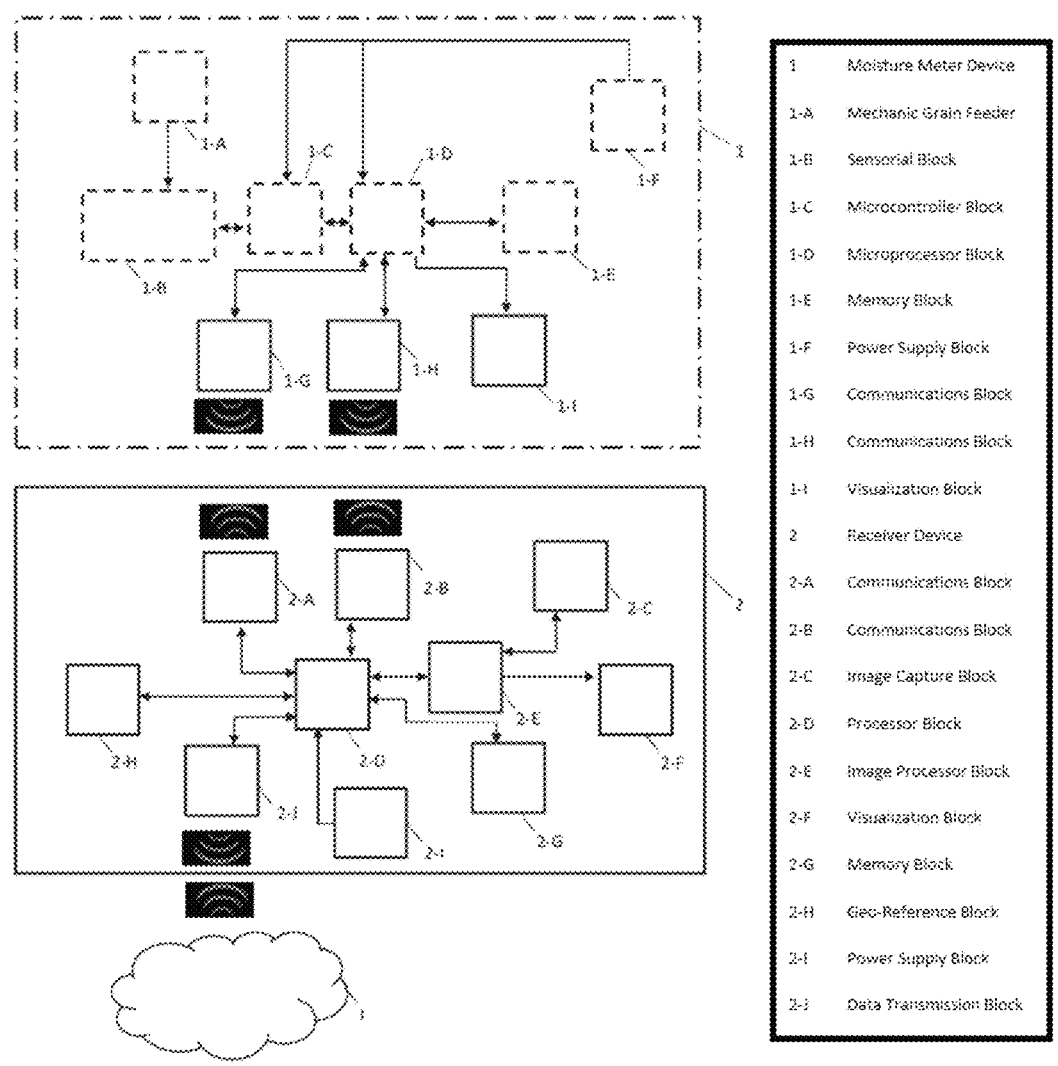

ENHANCEMENTS INTRODUCED IN A PORTABLE MOISTURE METER DEVICE FOR REMOTE USE

CROSS REFERENCE TO RELATED APPLICATION

This application claims the benefit of and takes priority from Brazilian Patent Application Serial No. 10 2016 008802 0 filed on Apr. 20, 2016, the contents of which are herein incorporated by reference.

BACKGROUND OF THE INVENTION

Field of the Invention

The present patent for a utility model refers to enhancements introduced in a portable moisture meter device for remote use, as applied in the productive chain of agribusiness, for the commercialization of agricultural products, wherein the results of moisture measurements for agricultural products and their derivatives is a key factor to determine the price of the product, by providing quality information for management reports to companies, private individuals and to the public for statistical purposes, with the purposes being to obtain precise information to feed a databank, historic data, statistics and control, by an innovative embodiment allowing data computerization, with advantages such as flexibility in the application, also in non-portable benches which are not remotely used, clear results which are not manipulated, quickness, maintenance and accuracy of results, with no human mistakes, to guarantee more complete information and better process management.

Description of the Related Art

As known by moisture meter manufacturing experts, there are currently portable moisture meter devices, which obtain the information by reading a display and transcribing it manually on paper.

This solution has disadvantages, limitations and inconveniences, such as higher possibility of mistakes in the transcription of the information as obtained from the display, generating lower data reliability due to human mistakes, which may compromise measurement results, by not storing results in the memory of the device.

SUMMARY OF THE INVENTION

"ENHANCEMENTS INTRODUCED IN A PORTABLE MOISTURE METER DEVICE FOR REMOTE USE", object of the present patent, have been developed to overcome the limitations, inconveniences and disadvantages of current portable Moisture meter devices, since, by means of an innovative embodiment using software allowing the automation of processed data, with the purpose to obtain precise information to feed a databank, historic data, statistics and control, with flexibility advantages for the application, also applied in non-portable benches which are not remotely used, clear results which are not manipulated, quickness, maintenance and precision of results, with no human mistakes and assuring more complete information and better process management.

The technical problems that the previous registrations have not solved and how they were solved by the Moisture meter device of the present patent are as follow:

1. When manually transcribing information as obtained during moisture measurement to the external databank (management), the quantity and quality of the information are compromised. Solved by using data transmission by computer devices.

2. Intentional or unintentional manipulation of results as obtained by the measurements may occur. Solved by using encrypted data transmission by computer devices, assuring the transmission of safe information.

3. The transcription of the information takes too long and the productivity is low. Solved by using direct data transmission by computer devices.

4. Some current devices do not store the results of the performed analyses and do not keep a history of them. Solved by using memory in computer devices.

5. Manually collected information are limited, compromising the databank and consequently management and statistical analyses. Solved by using a mobile phone, tablet or microcomputer with a dedicated application.

BRIEF DESCRIPTION OF THE DRAWINGS

For a better understanding of the present invention, the following drawings are attached:

FIG. 1, showing a schematic diagram view of the portable moisture meter device for remote use as enhanced by the present patent.

DETAILED DESCRIPTION OF THE SEVERAL EMBODIMENTS

In accordance with said drawings, the enhanced moisture meter device of the present patent is constituted by a moisture meter device (1) equipped with a mechanic grain feeder (1-A), a sensorial block (1-B) equipped with a temperature sensor, a frequency sensor, a moisture sensor and a weight sensor, a microcontroller block (1-C), a microprocessor block (1-D), a memory block (1-E) and a power supply block (1-F) with enhancements introduced and additionally incorporated by communications block (1-G) equipped with a Bluetooth® module and bi-directionally linked to the microprocessor block (1-D) and remotely to the communications block (2-A) of the receiver device (2), a communications block (1-H) equipped with a Wi-Fi module and bi-directionally linked to the microprocessor block (1-D) and remotely to the communications block (2-B) of the receiver device (2), and a visualization block (1-I) equipped with a display and a QRcode display, uni-directionally linked to the microprocessor block (1-D); and a receiver device (2) like a mobile phone, tablet or microcomputer with a communications block (2-A) equipped with a Bluetooth® module bi-directionally linked to the processor block (2-D) and remotely linked to the communications block (1-G), with a communications block (2-B) equipped with a Wi-Fi module bi-directionally linked to the processor block (2-D) and remotely linked to the communications block (1-H), with an image capture block (2-C) bi-directionally linked to the image processor block (2-E), with a processor block (2-D) uni-directionally linked to the power supply block (2-I) and bi-directionally linked to the communications block (2-A), to the communications block (2-B), to the image processor block (2-E), to the memory block (2-G), to the geo-reference block (2-H) and to the data transmission block (2-J), with the image processor block (2-E) uni-directionally linked to the visualization block (2-F) and bi-directionally linked to the processor block (2-D) and to the image capture block (2-C), with a visualization block (2-F) like a display and uni-directionally linked to the image processor block (2-E), with a memory block (2-G) with saved dedicated software and bi-directionally linked to the processor block (2-D), with a geo-reference block (2-H) equipped with a GPS module bi-directionally linked to the processor block (2-D), with a power supply block (2-I) uni-directionally linked to the processor block (2-D) and with a data transmission block (2-J) bi-directionally linked to the processor block (2-D) and remotely linked to the internet (I).

The dedicated software (S) helps to perform the following sequence of processes:

a. by means of the communications blocks (1-G) or (1-H) or the visualization block (1-I), encrypted data as obtained by the Moisture meter device (1) is remotely transmitted and received by the communication blocks (2-A) or (2-B) or image capture block (2-C) and, in case of the block (2-C), data is previously sent to the image processor (2-E);

b. data as received is processed and decrypted by the processor block (2-D);

c. the geo-reference block (2-H) provides GPS data to the processor block (2-D), jointly with the data as mentioned by item B as stored by the memory block (2-G);

d. stored data is shown on the display (2-F); and e. stored data is transmitted and shared by using the data transmission block (2-J) and the internet (I).

In the case of bench devices, the data as transmitted and shared may be directly printed.

The operation of the moisture meter device of the present patent is performed as follows:

a. product data is selected on the display (2-F);

b. grain is put inside the grain feeder (1-A);

c. the moisture meter device (1) acknowledges the presence of the grain and processes temperature, moisture and weight information, storing it in the memory;

d. the receiver device (2) is put closer to the moisture meter device (1), and the receiver device (2) shows the list of nearby moisture meter devices; the chosen one is clicked and the data is remotely and automatically transmitted; and e. the information is shown on the display (2-F) and shared by the data transmitter (2-J).

What is claimed is:

1. An Enhancement introduced in a portable moisture meter device for remote use comprising:
    a moisture meter device (1), wherein the moisture meter device (1) comprises:
        a mechanical grain feeder (1-A);
        a sensorial block (1-B), wherein the sensorial block (1-B) further comprises:
            a temperature sensor;
            a frequency sensor;
            a moisture sensor; and
            a weight sensor;
        a micro-controlling block (1-C);
        a micro-processor block (1-D);
        a memory block (1-E);
        a power supply block (1-F);
        a communications block (1-G) provided with a Bluetooth® module, wherein the communications block is bi-directionally linked to the microprocessor block (1-D)
        a communications block (1-H) provided with a Wi-Fi module and bi-directionally linked to the microprocessor block (1-D) and remotely linked to the communications block (2-B) of the receiver device (2), and
        a visualization block (1-I) provided with a display and a Quick Response Code (QRcode) display, uni-directionally linked to the microprocessor block (1-D); and
    a receiver device (2), wherein the receiver comprises:
        a communications block (2-A) provided with a Bluetooth® module remotely to the communications block (1-G) provided with a Bluetooth® module of the moisture meter device (1);
        a communications block (2-B) provided with a Wi-Fi module; remotely linked to the communications block (1-H) provided with a Wi-Fi- module of the moisture meter device (1);
        an image capture block (2-C);
        a processor block (2-D) bi-directionally to the communications block (2-A) provided with a Bluetooth® module of the receiver and to the communications block (2-B) provided with a Wi-Fi module of the receiver;
        an image processor block (2-E) bi-directionally linked to the processor block (2-D) of the receiver and to the image capture block (2-C) of the receiver;
        a display-type visualization block (2-F) uni-directionally linked to the image processor block (2-E), with
        a memory block (2-G) with a saved dedicated software and bi-directionally linked to the processor block (2-D) of the receiver;
        a geo-reference block (2-H) provided with a Global Positioning System (GPS) module bi-directionally linked to the processor block (2-D) of the receiver;
        a power supply block (2-I) uni-directionally linked to the processor block (2-D) of the receiver; and
        a data transmission block (2-J) bi-directionally linked to the processor block (2-D) of the receiver, and wherein the data transmission block of the receiver is remotely to an internet (I);
    wherein the communications block (1-G) provided with a Bluetooth® module of the moisture meter device (1) is bi-directionally linked to the microprocessor block of the moisture meter device (1) and remotely linked to the communications block of the receiver;
    wherein the communications block (1-H) provide with a Wi-Fi module is bi-directionally linked to the microprocessor block of the moisture meter device (1) and remotely linked to the communications block (2-B) of the receiver.

2. A method for capturing data obtained by the moisture meter device of claim 1, comprising the steps of:

a. obtaining encrypted data by means of the communication block (1-G) provided with a Bluetooth® module of the moisture meter device, the communication block (1-H) provided with a Wi-Fi module of the moisture meter device, or the visualization block (1-I) of the moisture meter device, wherein the encrypted data; is remotely transmitted and received by the communications block (2-A) provided with a Bluetooth® module of the receiver or the communication block (2-B) provided with a Wi-Fi module of the receiver, or the image capture block (2-C) of the receiver, and, in case of the image capture block (2-C), the encrypted data is previously sent to the image processing device (2-E) of the receiver;

b. processing and decrypting the received encrypted data by the processor block (2-D) of the receiver;

c. providing the decrypted data from the GPS by the geo-reference block (2-H) of the receiver to the processor block (2-D) of the receiver, and storing the decrypted data by the memory block (2-G) of the receiver;

d. displaying the stored data on the display-type visualization block (2-F) of the receiver; and e. transmitting and sharing the stored data by using the data transmission block (2-J) of the receiver and the internet (I).

3. The enhancement introduced in a portable moisture meter device for remote use of claim 1, wherein the receiver is selected from the group consisting of: a mobile phone, tablet, and microcomputer.

\* \* \* \* \*